United States Patent [19]

Kendall et al.

[11] Patent Number: 4,675,803
[45] Date of Patent: Jun. 23, 1987

[54] SYSTEM FOR PROCESSING INFORMATION

[75] Inventors: Burton Kendall; Thomas King, both of Saratoga, Calif.

[73] Assignee: Measurex Corporation, Cupertino, Calif.

[21] Appl. No.: 900,228

[22] Filed: Aug. 25, 1986

Related U.S. Application Data

[63] Continuation of Ser. No. 584,832, Feb. 29, 1984, abandoned.

[51] Int. Cl.$^4$ .................... G06F 15/16; G06F 15/46
[52] U.S. Cl. ......................... 364/131; 364/137; 364/200
[58] Field of Search ............. 364/131–137, 364/200 MS File

[56] References Cited

U.S. PATENT DOCUMENTS

| | | | |
|---|---|---|---|
| 4,118,771 | 10/1978 | Pomella et al. | 364/134 |
| 4,151,590 | 4/1979 | Azegami | 364/131 |
| 4,347,564 | 8/1982 | Sugano et al. | 364/132 |
| 4,456,951 | 6/1984 | Henneberger et al. | 364/131 |
| 4,459,655 | 7/1984 | Willemin | 364/132 |
| 4,514,814 | 4/1985 | Evans | 364/132 X |
| 4,567,560 | 1/1986 | Polis et al. | 364/132 X |

OTHER PUBLICATIONS

Goodenough—"The Analog World: Getting Faster and Smarter"-Electronic Design-Sept. 16, 1982-pp. 69-82.

*Primary Examiner*—Joseph Ruggiero
*Attorney, Agent, or Firm*—Hal J. Bohner

[57] ABSTRACT

A system is provided to receive and process information including a processor, an operator station and an interconnect processor. The interconnect processor is coupled to the processor by a first bus, and the interconnect processor is coupled to the operator station by a second bus.

6 Claims, 2 Drawing Figures

SYSTEM FOR PROCESSING INFORMATION

This application is a continuation of prior co-pending application Ser. No. 584,832 filed Feb. 29, 1984, now abandoned.

BACKGROUND OF THE INVENTION

1. The Field of the Invention

This invention relates to an information receiving and processing system.

2. State of the Art

Industrial processes are often controlled by computer-based systems. The process control system can include analog to digital converters coupled to sensors which measure various operating parameters of the process. Sensors measure operating parameters and generate analog electrical signals indicative of measured parameters, and analog to digital converters convert the analog signals to digital signals. The digital signals are transmitted to a computer control system which compares the digital signals with target values entered into the control system by an operator via an operator station, and the computer generates digital control signals. The computer control system can include controllers of the so-called proportional, integral, derivative type, i.e. a PID controller. The digital control signals are transmitted to digital to analog converters which convert the signals to analog form, and the analog signals are transmitted to control the process.

Computer-based process control systems of the type discussed above are effective for controlling relatively simple industrial processes. However, for complex industrial processes it is often necessary to interconnect a plurality of PID controllers in cascade fashion so that the signal from one PID controller is processed by at least one additional PID controller. Interconnection of the PID controllers is accomplished by physically wiring the controllers together, which results in a relatively inflexible system since the controllers are, of course, wired in a predetermined configuration which cannot be changed without reconstruction of the system.

OBJECTS OF THE INVENTION

An object of the present invention is to provide a system for receiving and processing information to control an industrial process wherein an operator can easily and quickly interconnect controllers.

Another object is to provide such a system having an improved means for permitting the operator to receive information from the control system.

Further objects and advantages of the present invention can be ascertained by reference to the drawings and specifications which are offered by way of example and not in limitation of the invention which is defined by the claims and equivalents thereto.

DETAILED DESCRIPTION OF THE PREFERRED EMBODIMENTS

Figure 1:
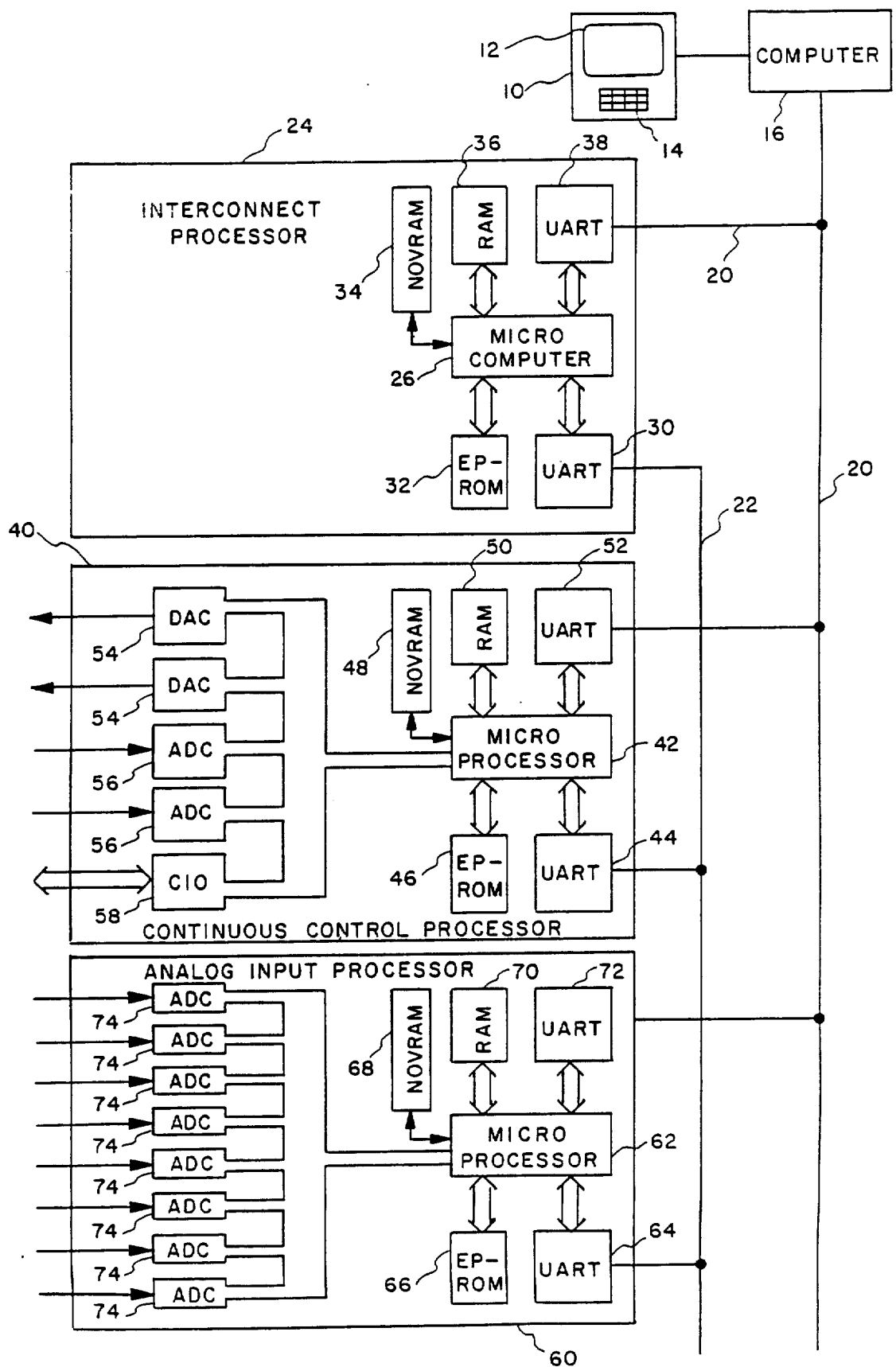
FIG. 1 is a schematic illustration of one embodiment of the present invention.

In FIG. 1 there is shown one embodiment of the present invention, including an operator station 10 having a screen 12 for displaying information and a keyboard 14 to permit an operator to enter information. The operator station 10 can be conventional, and therefore will not be described in detail herein. The operator station is electrically connected to an operating computer 16 which in the present embodiment can be a single-board computer manufactured by Intel Corporation, model iSBC 86/30 or another suitable computer such as Digital Equipment Corporation's PDP 11/23 or VAX 11/730.

The operating computer 16 is configured to receive information from the operator station 10 and process the information to put it in a form which can be utilized by other components of the system. The computer 16 is also configured to receive information from other parts of the system and convert the information into a form which can be utilized by the operator station 10. The computer 16 is connected to an instrumentation bus 20 and an interconnect bus 22, and the buses are connected to other components of the system as will be discussed hereinafter. The instrument bus 20 includes a conventional fiber optic cable extending from the computer 16 to a card cage, not shown, which includes a backplane to which other parts of the system are connected. The instrument bus 20 also includes a trace etched on the backplane. The interconnect bus 22 is a trace etched on the backplane in the card cage. Other conventional types of serial conductors could be used for both buses 20 and 22.

The present embodiment includes an interconnect processor 24, which is a micro computer system constructed on two printed circuit boards and includes a micro computer 26 and associated electronics. The printed circuit boards are designed to connect to a back plane to permit communication between the interconnect processor 24 and other elements of the system.

The interconnect processor 24 is designed to receive information, perform mathematical and logical manipulations of the information, and tranfer information to another location in the system. In FIG. 1, the interconnect processor 24 is illustrated schematically, showing the processor's basic functions. It should be recognized that individual electronic components such as resistors, capacitors, operational amplifiers and the like are not shown because they can be determined by a skilled worker. The processor 24 includes a microcomputer 26 capable of performing mathematical and logical operations. In the present embodiment the microcomputer 26 is an Intel Model 8031 microprocessor. The microcomputer is coupled to a universal asynchronous receiver/transmitter or UART 30 which is a digital electronic device for receiving serial signals and converting them to parallel signals. The UART 30 is capable of connecting to the interconnect bus 22 and receiving signals from and transmitting signals to the bus 22. The microcomputers 26 also is coupled to an erasable, programmable read only memory, EPROM 32, for storing information. The microcomputer 26 is also supplied with additional memory from non-volatile random access memory, NOVRAM 34 and random access memory, RAM 36, both of which are coupled to the microcomputer 26. The microcomputer is coupled to a second UART 38 which is the same as the first UART 30 except that the second UART 38 is coupled to the instrumentation bus 20.

The interconnect processor 24 can be configured by an operator via the operator station 10. Thus, the operator can program the microcomputer to perform various functions selected from an array of preselected functions. For example, the operator can configure the interconnect processor 24 to receive information from another part of the system, operate upon the information in a preselected manner to create new information and transmit the new information to a different part of the system.

To receive data from other parts of the system, the interconnect processor 24 sends a poll request periodically to other parts of the system, and each part upon such request responds with either a process status or data.

The interconnect processor 24 is capable of performing information processing functions including mathematical and logical manipulation of data. For example, the processor 24 can collect data from other parts of the system concerning such parameters as measured temperatures, pressures and flows and calculate operating data from the measured data by predetermined algorithms stored in the interconnect processor 24. The operating data can then be transmitted to other parts of the system via the UART 30 and the interconnect bus 22 or the data can be transmitted to the operator station via UART 38 and the instrumentation bus 20.

With further reference to FIG. 1, the present embodiment includes a continuous control processor 40, which is constructed on two printed circuit boards and includes a micro processor 42. Preferably, the micro processor 42 is an Intel Model 8031, and the printed circuit boards also include additional electronics. In FIG. 1 the continuous control processor 40 is illustrated schematically, showing the processor's basic functions. A single continuous control processor 40 is illustrated; however in practice at least one additional continuous control processor 40, not shown, is coupled to the interconnect bus 22 and the instrumentation bus 20.

The processor 40 includes a microcomputer 42 capable of performing mathematical and logical operations. The microcomputer 42 is coupled to a universal asynchronous receiver/transmitter or UART 44 which is a digital electronic device for receiving series signals and converting them to parallel signals. The UART 44 is connected through a backplane to the interconnect bus 22 and receives signals from and transmits signals to the bus 22. The microcomputer also is coupled to an erasable, programmable read only memory, EPROM 46, for storing information, and the microcomputer 42 is also supplied with additional memory from non-volatile random access memory, NOVRAM 48 and random access memory, RAM 50, both of which are coupled to the microcomputer 42. The microcomputer 42 is coupled to a second UART 52 which is the same as the first UART 44 except that the second UART 52 is coupled through a backplane to the instrumentation bus 20.

The continuous control processor 40 also includes two digital to analog converters, DAC's 54, two analog to digital converters, ADC's 56 and one contact input-output device, CIO 58. Each of the DAC's 54, ADC's 56 and the CIO 58 are coupled to communicate with the microcomputer 42. The ADC's 56 are conventional devices for receiving analog electrical signals from a measurement device such as a thermocouple or flowmeter, and converting the analog signal to a digital signal which can be interpreted by a microcomputer. The DAC's 54 are conventional devices for receiving digital electrical signals from the microcomputer and converting the digital signals to analog signals which can be transmitted to and utilized by servo mechanical devices. The CIO 58 is a conventional device for receiving four digital electronic signals from measurement devices and for transmitting the signals in a form acceptable by a microcomputer and for transmitting digital electronic signals to four devices in a form acceptable by digital servo mechanisms such as valve controllers. The DAC's 54, ADC's 56 and CIO 58 are coupled to a backplane which in turn is connected to sensors and servomechanical devices associated with the process which is being controlled.

When the system is initially started up, the operator inputs information via the operator station 10 into the operating computer 16 which generates signals which are transmitted to the continuous control processor 40 to initially configure the continuous control processor 40. That is, the operator programs the microcomputer 42.

The continuous control processor 40 can be configured to function as a single loop controller which is a conventional device capable of controlling a part of a controlled process designated as a loop. The continuous control processor 40 can be configured to operate as one of various types of single loop controllers such as a conventional PID (proportional/integral/derivative) controller, or other types of controllers. In order to configure the controller function of the continuous control processor 40, information specifying the parameters of the control function is entered by the operator into the operator station 10, and the information is transmitted from the operating computer 16 to the microcomputer 42. For example, if the processor 40 is to be configured as a conventional PID controller, the operator must specify such parameters as the proportional gain, the integral gain, and the derivative gain. In complex systems it is often necessary to transmit the output of one processor 40 to a second processor 40 and control the controlled process from the output of the second processor 40. This is called cascade-type control, and may be accomplished in some cases with more than two processors by transmitting the output of each processor to another processor in serial fashion with the first processor receiving information from the controlled process and the last in the series controlling the process. When cascading is done, information is transmitted between continuous control processors via the interconnect bus 22.

Likewise, the ADC's 56 must be configured by the operator before the system begins operation. To configure an ADC the operator must identify the range of analog data which will be received by the ADC and other conventional parameters.

Periodically during operation the processor 40 reports certain operating parameters to the operator station 10. For example, the change in the percent value of the analog input can be compared against a dead band limit. If the percent value exceeds the dead band limit, then a message is transmitted to the operator station 10.

Also, during operation the continous control processor 40 reads, processes, limit checks and reports process input values from the ADC's 56 and CIO 58 according to the configuration data supplied. Exceeded limits or device failures are reported to the operator station 10. Measured process operating parameters can be reported to the operator station 10 at regular intervals or only when a change of a user specified magnitude is detected. The continuous control processor 40 is also capable of checking limits for a process value it receives and reporting particular deviations. The operator supplies the limits which are to be tested to the continuous control processor 40.

Control signals of the continuous control processor 40 are transmitted by a DAC 54 which converts the digital signals from the microprocessor 42 to analog-type signals used in operating a device such as a servomechanism comprising part of the controlled process. The various operating parameters of the DAC 54 can be configured by the operator of the system.

The present embodiment includes an analog input processor 60, which is constructed on two printed circuit boards and includes a microcomputer which preferably is an Intel Model 8031 microprocessor. The processor 60 is capable of reading, processing, limit checking and reporting engineering values. The process readings can be configured to report back to the operator station 10 on a continuous basis or on an exception basis.

In FIG. 1, the analog input processor 60 is illustrated schematically, showing the processor's basic functions. A single analog input processor is shown; however, in certain applications additional analog input processor 60 can be coupled to the interconnect bus 22 and the instrumentation bus 20. The processor 60 includes a microcomputer 62 capable of performing mathematical and logical operations. the microcomputer 62 is coupled to a universal asynchronous receiver/transmitter or UART 64 which is capable of connecting to the interconnect bus 22 and receiving signals from and transmitting signals to the bus 22. The microcomputer 62 also is coupled to an erasable, programmable read only memory, EPROM 66, non-volatile random access memory, NOVRAM 68 and random access memory, RAM 70. The microcomputer 62 is coupled to a second UART 72 which is the same as the first UART 64 except that the second UART 72 is coupled to the instrumentation bus 20.

The analog input processor 60 includes eight ADC's 74 coupled to the microcomputer 62. The analog input processor 60 can be configured by an operator via the operator station 10. Thus, the operator can program the microcomputer 62 to perform various functions selected from an array of preselected functions.

In operation of the present system, an operator initially configures the system by programming the interconnect processor 24, the continuous control processors 40, and the analog input processors 60 by entering information into the operator station 10. After the system has been configured, it is capable of controlling an industrial process. Sensors which measure operation parameters of the process transmit data to the continuous control processors 40 and analog input processors 60. The continuous control processors 40 in some cases individually control certain parts of the process, while in other cases certain continuous control processors are interconnected by the interconnect processor 24. Interconnection of the continuous control processors 40 is performed by transmitting signals on the interconnect bus 22 to the interconnect processor 24 which operates upon the signals according to the programming of the microcomputer 26, and the signals are then transmitted to a second continuous control processor 40 via the interconnect bus. Further cascading of the processors 40 can be done in the same manner, if necessary.

While the process is being controlled, information is transmitted from the continuous control processors 40 and the analog input processors 60 to the operator station via the instrumentation bus 22. Transmitted information can include the actual data received from the sensors monitoring the process as well as data generated by the continuous control processors 40 and the interconnect processors 24 which can show trends in the actual, measured data, statistical analyses of the measured data or comparisons of various sets of actual data. Other information such as process alarms indicating out of limits conditions and maintenance alarms indicating such things as sensor failures, can be transmitted via the instrumentation bus 22. Also, the operator station 10 can receive information about set points and other parameters which are programmed into the PID controllers in the continuous control processors 40. Information can be transmitted to the operator station at predetermined intervals or an operator can request particular information on an ad hoc basis.

Thus it can be seen that information must flow between the three types of processors while information is being sent to and received from the operator station 10. The use of two separate buses to carry these two different types of information permits the information to flow rapidly without conflicting with other information. This permits the system to operate at much higher speed than if a single bus were used to transmit both types of information.

It should also be appreciated that the interconnect bus 22 permits the continuous control processors to be interconnected easily and quickly by an operator by simply programming the microcomputer resident on the interconnect processor. It is unnecessary to physically connect wires between the processors which would be time consuming and prone to mechanical failure. Moreover, in practice the operating computer 16 can be located a considerable distance from the processors. However, even if communication is interrupted between the processors and the computer 16, the interconnected control processors can continue to control the process.

Figure 2:
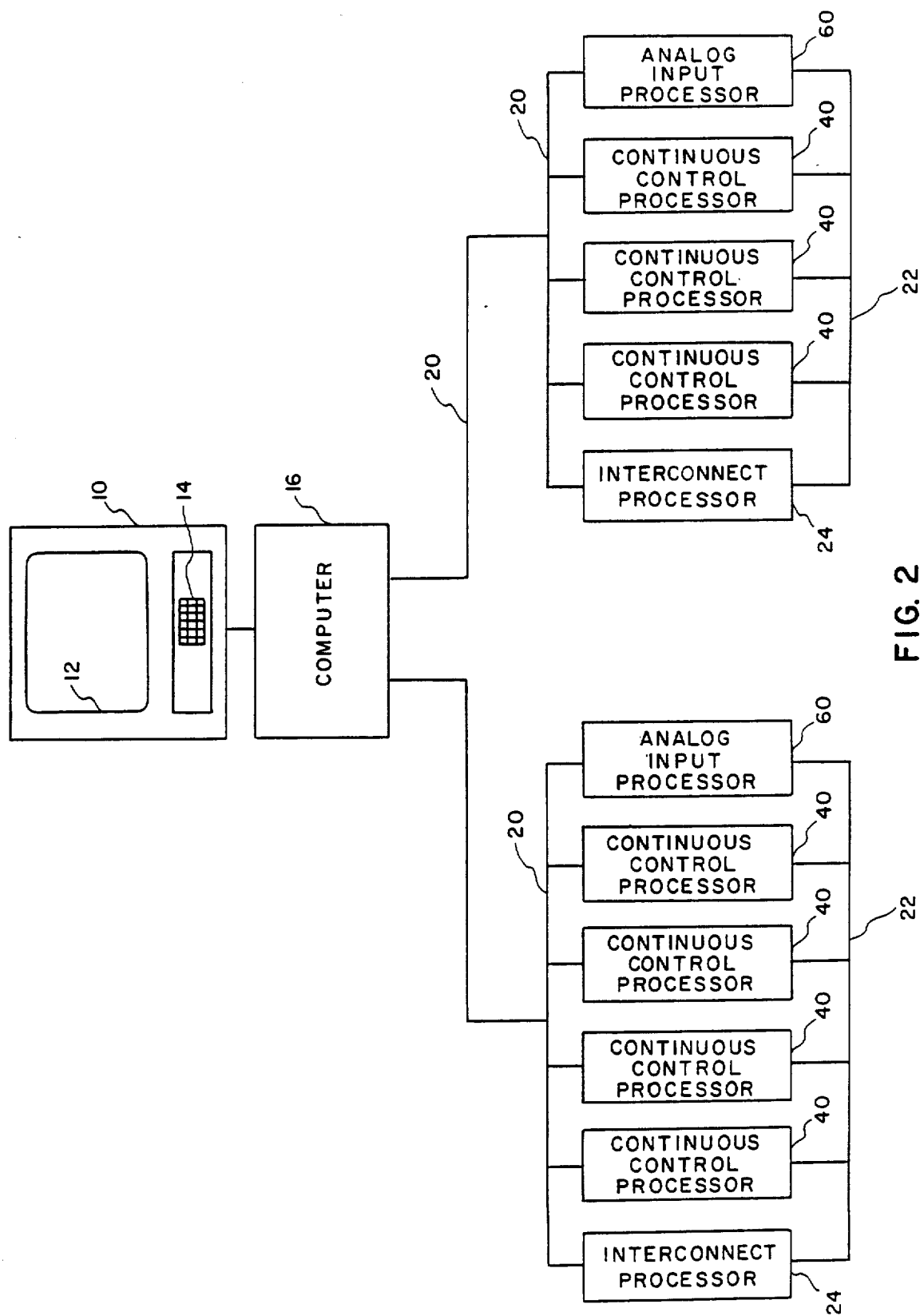
FIG. 2 is a schematic illustration of another embodiment.

Turning to FIG. 2 there is shown a somewhat more complex system than that illustrated in FIG. 1. In the FIG. 2 system two interconnect processors 24 are shown, one of which is connected to four continuous control processors 40 and one analog input processor 60 and the other of which is connected to three continuous control processors 40 and one analog input processor 60. In practice, the number of continuous control processors and analog input processors associated with each interconnect processor in a system is tailored to the particular application. In practice one interconnect processor can support any combination of up to 16 continuous control processors and analog input processors.

We claim:

1. A system for receiving and processing information comprising:
  (a) a first bus and a second bus;
  (b) a plurality of processors coupled to said first and second buses;
  (c) interconnect processor means to receive information, process information and transmit information, said interconnect processor means including a microcomputer wherein said microcomputer is coupled to said first bus via a first path including a receiver/transmitter and said microcomputer is coupled to said second bus via a second path including a receiver/transmitter, and said first and second paths are separate from one another so that data can be transferred between said microcomputer and said first bus at the same time the data is being transferred between said microcomputer and said second bus; and (d) operator station and computer means to receive information from an operator and to display information and coupled to said first bus to receive information from said processors.

2. A system according to claim 1 wherein said operator station means is coupled to said second bus to transmit and receive information via said second bus and said operator station is not directly coupled to said first bus.

3. A system according to claim 1 wherein said processors are continuous control processors.

4. A system according to claim 3 wherein said interconnect processor means is constructed and arranged to permit cascading of at least two continuous control processors.

5. A system according to claim 1 wherein said processors include at least one first continuous control processor coupled to receive information from said interconnect processor means via said first bus means.

6. A system according to claim 1 wherein said processors include an analog input processor.

* * * * *